Patented Jan. 10, 1939

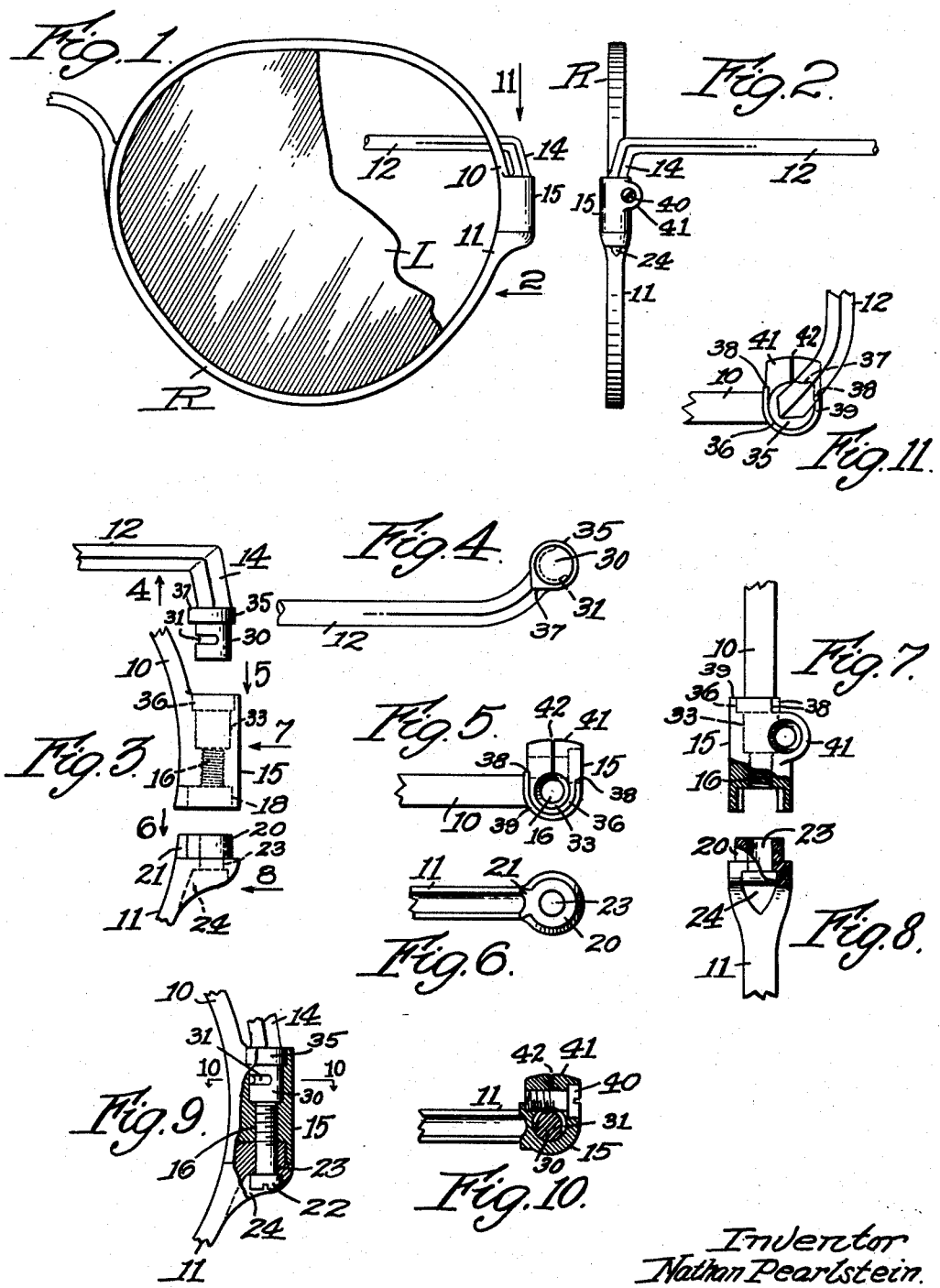

2,143,633

UNITED STATES PATENT OFFICE 2,143,633

OPHTHALMIC MOUNTING

Nathan Pearlstein, Boston, Mass.

Application July 21, 1937, Serial No. 154,844

2 Claims. (Cl. 88—53)

This invention relates to an ophthalmic mounting and more particularly to an ophthalmic mounting in which a separable lens rim is provided.

It is the general object of my invention to provide improved rim-connecting means, associated and in combination with improved means for pivotally connecting a temple to said rim.

A further object is to provide the above defined features so constructed and arranged that the resulting mounting is exceptionally pleasing in appearance and relatively inconspicuous.

My invention further relates to arrangements and combinations of parts which will be hereinafter described and more particularly pointed out in the appended claims.

A preferred form of the invention is shown in the drawing, in which

Fig. 1 is a front elevation of a portion of an ophthalmic mounting embodying my improvements;

Fig. 2 is a side elevation, looking in the direction of the arrow 2 in Fig. 1;

Fig. 3 is an enlarged front elevation of the structure shown in Fig. 1 but with the parts in spaced relation;

Fig. 4 is a bottom view of the pivoted end of the temple, looking in the direction of the arrow 4 in Fig. 3;

Figs. 5 and 6 are detail plan views of upper and lower rim parts, looking in the directions of the arrows 5 and 6 in Fig. 3 respectively;

Figs. 7 and 8 are side elevations of said parts, partially broken away and looking in the directions of the arrows 7 and 8 in Fig. 3;

Fig. 9 is a sectional front elevation of my improved construction;

Fig. 10 is a sectional plan view, taken along the line 10—10 in Fig. 9; and

Fig. 11 is an enlarged plan view, looking in the direction of the arrow 11 in Fig. 1.

Referring to the drawing, I have shown a portion of an ophthalmic mounting, including a rim R for holding a lens L, said rim comprising an upper rim part 10 and a lower rim part 11. I have also shown a temple 12 having a down-turned end portion 14 pivotally connected to the end of the rim part 10 in a manner to be described.

The upper rim part 10 has an enlarged lower end 15, provided with a threaded central opening 16 and with a concentric lower recess 18. The recess 18 receives a circular projection 20 on the upper end of the lower rim part 11, and is open at its inner edge to receive an inner extension 21 (Fig. 6) of the projection 20.

A binding screw 22 extends upward through an opening 23 in the end of the lower part 11 and is threaded into the opening 16 in the end 15 of the upper rim part 10. The head of the screw 16 is concealed in a recess 24 in the end of the rim part 11.

The down-turned end 14 of the temple 12 has a cylindrical bearing portion 30 provided with a segmental circumferential groove 31. The bearing portion 30 is mounted in a bearing opening 33 in the end 15, which bearing opening is aligned with the threaded opening 16 and recess 18 previously described.

The temple part 14 has an enlarged cylindrical portion 35 fitting an enlarged recess 36 above the bearing opening 33. The portion 35 has a V-shaped projection 37 (Figs. 4 and 11) at one side of said portion, and the recess 36 is cut away at one side to permit the projection 37 to swing. One or both of the ends 38 of the side wall 39 of the recess 36 are engaged by the sides of the projection 37 and form stops to limit swinging movement of the temple in one or both directions.

A retaining screw 40 is threaded in a rearwardly projecting ear 41 of the end 15, and this ear 41 may be slitted as indicated at 42. The screw 40 is so located that a portion of the screw enters the segmental groove 31 when the parts are assembled and thus prevents endwise displacement of the temple part 14. The slitted construction of the ear 41 permits the bearing friction on the temple to be adjusted by tightening or loosening the screw 40.

The temple 12 may be of any desired construction but is preferably of circular cross section in the body portion and of square or diamond-shaped section adjacent the pivot bearing thereof.

It will be particularly noted that the axis of the temple bearing is aligned with the axis of the binding screw 22 and is also preferably in the central plane of the lens L. The rim connection and temple bearing are thus very inconspicuous, the parts thereof projecting only slightly at the side and rear of the lens rim.

Having thus described my invention and the advantages thereof, I do not wish to be limited to the details herein disclosed, otherwise than as set forth in the claims, but what I claim is:—

1. In an ophthalmic mounting, a separable lens rim having upper and lower rim parts with telescoping end portions, a binding screw extending upward through the end of the lower rim part and secured in a threaded opening in the end of the upper rim part, and a temple having a down-turned end portion pivotally mounted in a bearing opening in the end of the upper rim part, which bearing opening forms an axial continuation of the threaded opening which receives said binding screw.

2. In an ophthalmic mounting, a separable lens rim having upper and lower rim parts with telescoping end portions, a binding screw extending upward through the end of the lower rim part and secured in a threaded opening in the end of the upper rim part, and a temple having a down-turned end portion pivotally mounted in a bearing opening in the end of the upper rim part, which opening is contiguous with said threaded opening, the pivotal axis of said temple end portion and bearing opening being substantially aligned with the axis of the threaded opening for said binding screw and being substantially in the central plane of the lens.

NATHAN PEARLSTEIN.